United States Patent
Stewart

(10) Patent No.: US 11,968,353 B2
(45) Date of Patent: Apr. 23, 2024

(54) CAMERA HEALTH DETERMINATION BASED ON LOCAL ANALYSIS OF SCENE INFORMATION CONTENT

(71) Applicant: ACUMERA, INC., Austin, TX (US)

(72) Inventor: Brett B. Stewart, Austin, TX (US)

(73) Assignee: Acumera, Inc., Austin, TX (US)

( * ) Notice: Subject to any disclaimer, the term of this patent is extended or adjusted under 35 U.S.C. 154(b) by 0 days.

(21) Appl. No.: 17/711,254

(22) Filed: Apr. 1, 2022

(65) Prior Publication Data

US 2022/0321872 A1 Oct. 6, 2022

Related U.S. Application Data

(60) Provisional application No. 63/170,854, filed on Apr. 5, 2021.

(51) Int. Cl.
*H04N 17/00* (2006.01)
*H04N 23/695* (2023.01)
*H04N 23/951* (2023.01)

(52) U.S. Cl.
CPC ......... *H04N 17/002* (2013.01); *H04N 23/695* (2023.01); *H04N 23/951* (2023.01)

(58) Field of Classification Search
CPC ... H04N 17/002; H04N 23/695; H04N 23/951
See application file for complete search history.

(56) References Cited

U.S. PATENT DOCUMENTS

| | | | | |
|---|---|---|---|---|
| 6,252,855 B1* | 6/2001 | Langley | ................. | H04L 47/10 370/252 |
| 8,924,364 B1* | 12/2014 | Zhong | ..................... | G06F 16/13 707/821 |
| 9,156,352 B2* | 10/2015 | Kim | ..................... | B60K 28/066 |
| 9,979,934 B1* | 5/2018 | Breiholz | ................. | G01W 1/18 |
| 10,187,494 B2* | 1/2019 | Stewart | .................... | H04L 67/34 |
| 10,379,545 B2* | 8/2019 | Kennedy | .............. | H04N 17/002 |
| 10,594,933 B2* | 3/2020 | Toda | ...................... | H04N 5/265 |
| 10,643,271 B1* | 5/2020 | Bronson | ................. | G08G 1/04 |
| 10,778,967 B2* | 9/2020 | Van Schoyck | ....... | G08G 5/0021 |
| 11,184,517 B1* | 11/2021 | Cui | ...................... | H04N 23/661 |
| 11,232,685 B1* | 1/2022 | Nixon | .................... | H04N 23/60 |
| 2002/0030853 A1* | 3/2002 | Kizaki | ............... | H04N 1/32358 358/1.16 |
| 2002/0089702 A1* | 7/2002 | Yoshitani | ........... | H04N 1/40068 358/448 |
| 2002/0123336 A1* | 9/2002 | Kamada | ............ | H04M 1/72406 455/418 |
| 2002/0147733 A1* | 10/2002 | Gold | ................... | G06F 11/1464 |
| 2004/0052418 A1* | 3/2004 | DeLean | ................. | G06F 21/32 382/209 |
| 2004/0203625 A1* | 10/2004 | Kim | ....................... | G06F 16/10 455/566 |

(Continued)

*Primary Examiner* — Brian P Yenke

(74) *Attorney, Agent, or Firm* — Kowert, Hood, Munyon, Rankin & Goetzel, P.C.; Jeffrey C. Hood

(57) ABSTRACT

A network edge device may receive one or more images originating from one or more camera devices. The network edge device may further, for respective images of the one or more images, determine a respective image size of the respective image. The network edge device may compare the respective image size to a respective threshold range and generate an alert if the respective image size falls outside of the respective threshold range.

20 Claims, 6 Drawing Sheets

(56) References Cited

U.S. PATENT DOCUMENTS

| | | | | |
|---|---|---|---|---|
| 2004/0233284 A1* | 11/2004 | Lesesky | ............ | G08B 13/1966 348/148 |
| 2007/0180482 A1* | 8/2007 | Frink | ................... | G08B 25/009 348/E7.086 |
| 2008/0039058 A1* | 2/2008 | Ray | ........................ | H04L 67/04 455/414.3 |
| 2008/0162822 A1* | 7/2008 | Okuyama | ............ | G06F 12/0866 711/134 |
| 2008/0294661 A1* | 11/2008 | Garza | ................... | H04L 51/214 |
| 2009/0096876 A1* | 4/2009 | Herberger | ............ | G11B 27/034 348/441 |
| 2012/0155713 A1* | 6/2012 | Arnaud | ................ | G06V 10/245 382/106 |
| 2012/0229647 A1* | 9/2012 | Calman | ............. | G08B 21/0476 348/158 |
| 2012/0330887 A1* | 12/2012 | Young | ................... | G06F 16/275 707/610 |
| 2013/0057728 A1* | 3/2013 | Ushijima | .............. | H04N 23/675 348/222.1 |
| 2013/0215266 A1* | 8/2013 | Trundle | ................... | H04N 7/18 348/143 |
| 2014/0267791 A1* | 9/2014 | Rainisto | .................. | G06F 3/005 348/207.1 |
| 2015/0154452 A1* | 6/2015 | Bentley | ................. | G11B 27/022 386/201 |
| 2015/0226551 A1* | 8/2015 | Lane | ....................... | B64D 47/08 348/117 |
| 2015/0281710 A1* | 10/2015 | Sievert | ............... | H04N 21/6547 |
| 2016/0119617 A1* | 4/2016 | Sagar | ..................... | H04N 23/75 348/187 |
| 2016/0187127 A1* | 6/2016 | Purohit | .................. | G08B 29/04 702/150 |
| 2017/0134687 A1* | 5/2017 | Rios, III | ................. | H04N 5/44 |
| 2018/0007321 A1* | 1/2018 | Brady | ..................... | G06T 7/174 |
| 2018/0146105 A1* | 5/2018 | Saito | ................... | H04N 1/00461 |
| 2019/0068829 A1* | 2/2019 | Van Schoyck | ..... | G01C 21/1656 |
| 2019/0068962 A1* | 2/2019 | Van Schoyck | ........ | G06T 7/0002 |
| 2020/0045100 A1* | 2/2020 | Rowny | ............... | H04L 67/1097 |
| 2020/0077892 A1* | 3/2020 | Tran | .................... | G08B 21/0492 |
| 2020/0118361 A1* | 4/2020 | Zula | ..................... | G01M 17/007 |
| 2020/0378759 A1* | 12/2020 | Suto | ........................ | G03B 13/20 |
| 2021/0067785 A1* | 3/2021 | Zhang | .................. | H04N 19/159 |
| 2021/0279901 A1* | 9/2021 | Suto | ......................... | G01C 3/02 |
| 2021/0287013 A1* | 9/2021 | Carter | ..................... | G06F 18/21 |
| 2022/0182552 A1* | 6/2022 | Kurz | ..................... | H04N 23/695 |
| 2022/0215529 A1* | 7/2022 | Krueger | .................. | G06F 18/2431 |
| 2022/0277486 A1* | 9/2022 | St. John | ................. | G06F 18/22 |
| 2023/0076325 A1* | 3/2023 | Krueger | ..................... | G06T 7/80 |
| 2023/0362485 A1* | 11/2023 | Kim | ...................... | H04N 23/695 |

* cited by examiner

CAMERA HEALTH DETERMINATION BASED ON LOCAL ANALYSIS OF SCENE INFORMATION CONTENT

PRIORITY CLAIM

This application claims benefit of priority to U.S. Provisional Application No. 63/170,854 titled "Camera Health Determination Based on Local Analysis of Scene Information Content" and filed on Apr. 5, 2021 which is hereby incorporated by reference in its entirety as if fully and completely set forth herein.

FIELD OF THE INVENTION

The present invention generally relates to remote and local access of camera systems, and more specifically to systems and methods for monitoring the health of camera systems as determined through analysis of locally extracted scene information content.

DESCRIPTION OF THE RELATED ART

There are a large number of electronic camera devices attached to networks at retail and other premises. These cameras are typically accessible via a network, and are used to provide both operation functions (e.g., people counting or empty parking space detection) or to provide a record of events for security and/or forensic/investigative purposes. For example, merchants, such as gas stations or convenience stores, often have to manage or monitor many different premise camera devices (devices at a location or premises) in order to properly maintain security of operations.

In order to properly monitor these electronic camera devices for such events that result in faulty or non-useful camera feeds or imagery, often it is desired for these devices to be accessed and monitored from a remote location. Thus, these devices are often attached to those premise networks in a way that allows them to initiate connections via the Internet to other devices or services located away from the premises, for example, to remotely record a stream of images. The owners or users of these devices may then find it useful to access them from a location distant to the premises where the devices are connected.

Furthermore, when large numbers of cameras are deployed at a premise, they are often accompanied by at least some local image storage capability such as a DVR (digital video recorder). There are many thousands of digital video recorders in service, for the purpose of providing premise security and loss prevention. These digital video recorders are often also intended to be remotely accessed, and their owners may have enabled network access to these devices from any distant location.

However, it is often the case that the mere presence and accessibility via a network does not fully indicate normal operational health of a camera system. In some cases when the video record is consulted (from the local DVR, for example), it is discovered that key information is missing. For example, if a criminal activity on the premises is being analyzed, the criminals may have physically destroyed or spray-painted the camera lens as a means to prevent a video record of their activity.

One method for monitoring a camera's health is to "ping" the camera by sending a small network message and waiting a short period of time for the camera to return a response to the message. However, this may not be a reliable indication that the entire camera system is fully functional.

Another method for detecting camera health is to periodically extract images or streams of images from the camera, and to consider the successful collection of a valid image as an indicator of camera health. However, other camera health issues, such as partial or complete failure of the image sensor, pixel processor, or image processor may not be detected by this method.

An additional method for detecting camera health may be to export image or image stream data from the local premises to a "cloud" or remote server for the purpose of performing more sophisticated analysis of the images. However, the network may have insufficient capacity to support this method, especially when there are a large number of cameras at the premises.

Accordingly, improvements in determining complete camera system health and/or functionality are desired.

SUMMARY OF THE INVENTION

Various embodiments are described of a system and method for monitoring and determining camera system functionality through analysis of locally extracted scene information content.

Embodiments of the invention may provide a much more reliable mechanism for determining faulty or non-useful camera feeds. For example, by extracting and analyzing content at the location containing the premise camera devices, a user may be able to more efficiently determine faulty or non-useful camera feeds by not having to utilize the network to which the feeds are connected, which may further lack the capability or capacity to provide said analysis. As one example, imagery that has been locally extracted may not contain sufficient visual information such that it exceeds or is larger than a certain threshold value or range.

Some embodiments may include a non-transitory computer readable storage medium comprising program instructions executable by at least one processor of a network edge device. The program instructions may cause the network edge device to receive one or more images originating from one or more camera devices. Furthermore, the program instructions may cause the network edge device to, for respective images of the one or more images, determine a respective image size of the respective image. Additionally or alternatively, the program instructions may cause the network edge device to compare the respective image size to a respective threshold range and generate an alert if the respective image size falls outside of the respective threshold range.

In some embodiments, the program instructions may be further executable to determine, based on one or more algorithms, the respective threshold range. Additionally or alternatively, the respective image size may correspond to one or more sub-regions of the respective image. According to some embodiments, a different alert may be generated if a plurality of respective image sizes of the one or more images originating from a camera device of the one or more camera devices is approximately equal. In some embodiments, the network edge device may comprise internal memory storage of typical image sizes used in determining the threshold range. Additionally or alternatively, the network edge device may comprise internal memory storage of at least one of one or more standard deviation values, one or more minimum image sizes, and one or more maximum image sizes used in determining the threshold range.

According to some embodiments, a network edge device may include communication circuitry for establishing a connection between at least one premise camera device and a remote user. The network edge device may further include at least one processor coupled to the communication circuitry and the at least one processor is configured to cause the network edge device to receive one or more images originating from the at least one premise camera device, according to some embodiments. Additionally or alternatively, the network edge device may determine one or more image sizes of the one or more images, compare the one or more image sizes to a threshold value, and generate an alert if any of the one or more image sizes is less than the threshold value.

In some embodiments, the network edge device may determine, based on one or more algorithms, the threshold value. Additionally or alternatively, respective image sizes of the one or more image sizes may correspond to one or more respective sub-regions of the one or more images. In some embodiments, a different alert may be generated if a plurality of the one or more image sizes of the one or more images originating from a camera device of the one or more camera devices is approximately equal. In some embodiments, the network edge device may comprise internal memory storage of one or more typical image sizes and one or more threshold values. According to some embodiments, the threshold value may be automatically compared to the one or more image sizes at least partially in response to receiving the one or more images and determining the one or more image sizes. Additionally or alternatively, the network edge device may include internal memory storage of at least one of one or more standard deviation values, one or more maximum image sizes, and one or more minimum image sizes used in determining the threshold value.

According to some embodiments, a method by a network edge device may comprise receiving one or more images originating from at least one premise camera device. The method may further include determining one or more image sizes of the one or more images, determining a difference between the one or more image sizes and one or more threshold values of a threshold range, and generating an alert if an absolute value of the difference is greater than at least one of the one or more threshold values, according to some embodiments.

In some embodiments, the method may further include determining a difference between the one or more image sizes and one or more additional threshold values of a second threshold range and generating a different alert if an absolute value of the difference is greater than at least one of the one or more additional threshold values. Additionally or alternatively, a first image size of the one or more image sizes may correspond to a first sub-region of a first image of the one or more images.

According to some embodiments, the method the at least one premise camera device is capable of altering at least one of its viewing scene and field of view. Additionally or alternatively, the method may further include receiving one or more additional images originating from at least one premise camera device and corresponding to at least one of one or more different viewing scenes and different fields of view. The method may also include determining one or more additional image sizes of the one or more additional images, determining a difference between the one or more additional image sizes and one or more additional threshold values of a second threshold range, and generating a different alert if an absolute value of the difference is greater than at least one of the one or more additional threshold values, according to some embodiments. Additionally or alternatively, the method may further include generating a different alert if a plurality of the one or more image sizes of the one or more images originating from the least one premise camera device is approximately equal. According to some embodiments, the network edge device may comprise internal memory storage of at least one of one or more standard deviation values, one or more maximum image sizes, and one or more minimum image sizes used in determining the one or more threshold values of the threshold range.

BRIEF DESCRIPTION OF THE DRAWINGS

A better understanding of the present invention may be obtained when the following detailed description is considered in conjunction with the following drawings, in which.

Figure 1:
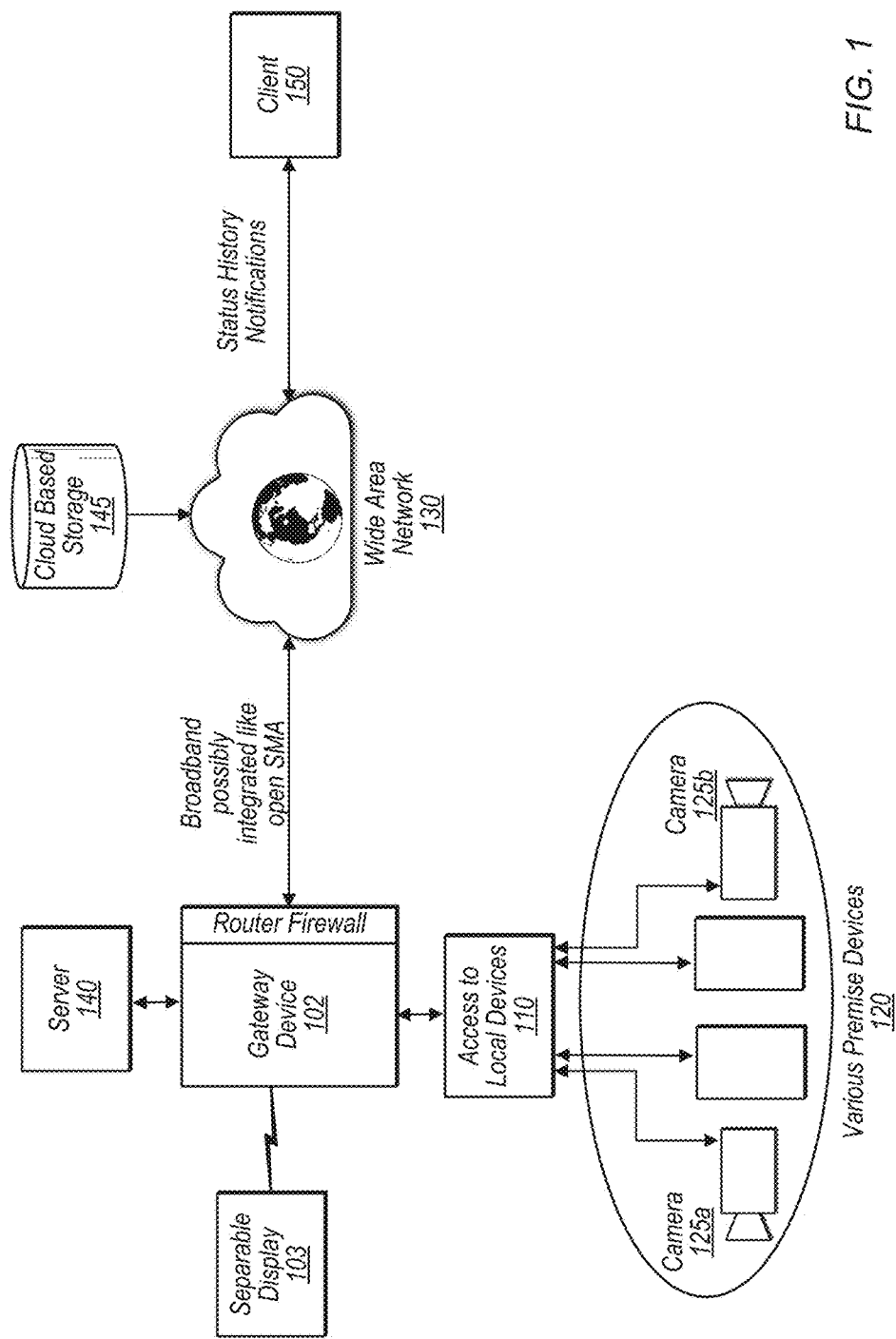
FIG. 1 illustrates a system which provides ephemeral secure access to devices, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Gateway Device—refers to a device that is configured to couple to a wide area network, such as the Internet, and also couple (either wired or wirelessly) to one or more devices, and which is configurable with one or more application programs to monitor and/or control the one or more devices. The term "Merchant Gateway Device" refers to a Gateway Device that is configured to be placed at a merchant location, e.g., which is configurable with one or more application programs to monitor and/or control one or more devices that would typically be located at a merchant location.

Network Edge Security Appliance (NESA)—refers to a device that is configured to couple to a wide area network, such as the Internet, and also couple (either wired or wirelessly) to one or more camera devices or digital video recorders (DVRs), and which is configurable with one or more application programs to monitor and/or control the one or more camera devices and/or DVR.

FIG. 1—System Providing Secure Access to Devices

FIG. 1 illustrates a system that may be involved or co-located with the embodiments described herein. However, the system of FIG. 1 is exemplary only and other systems and configurations are envisioned. For example, any desired type of device (e.g., other than a gateway device described below) may be configured to implement various embodiments described herein.

In FIG. 1, an exemplary location (e.g., a merchant location, such as a store) is illustrated. The location includes a gateway device 102, which may manage the network connection to and from various premise devices of the store. The gateway device 102 may include a built-in display or may have a separable display 103. In some embodiments, the separable display 103 may be simply a display device or it may be another system (e.g., a computer or smart device) that includes a display and is able to access the gateway device 102. The separable display 103 may be on the same premises as the gateway device 102 or in a different location, as desired.

As shown, the gateway device may be coupled (in a wired or wireless fashion via the access to local devices 110, such as through a wired or wireless local area network) to various premise devices 120 in the location (among other types of devices, including camera devices 125a and 125b). The gateway device 102 may be installed at the location in a relatively straightforward manner. For example, the gateway device 102 may simply be screwed into the wall and connected to a local Internet connection or network connection. In some embodiments, the gateway device 102 may be a ruggedized device and may be stored in an electrical closet.

In some embodiments, the gateway device 102 may include security software or circuitry, e.g., to provide a firewall for the Internet connection, inspect network traffic for indications of compromise, perform communication encryption, protect credit card information provided over the network connection, etc. In further embodiments, the gateway device may provide a local area network (LAN) that at least a subset of the various premise devices 120 may connect to, e.g., in order to communicate with the gateway device and/or the Internet. For example, access to local devices 110 may be included as part of the gateway device 102. Similarly, the gateway device 102 may provide a wireless hotspot for the retail or other premises, e.g., which may be accessible by employees of the premises and/or customers of the retail store, as desired.

The various premise devices 120 to which the gateway device may be coupled may include one or more store security devices/systems (e.g., cameras etc.) which may be further connected (via a wired or wireless connection) to various local or remote computers or servers, the local area network of the retail or other premises, any network connection(s) (e.g., the Internet) of the store, wireless network(s), etc.

As described in U.S. Pat. No. 10,187,494 (incorporated by reference as if set forth in its entirety herein), the gateway device 102 may monitor or control these various premise devices. For example, the gateway device 102 may monitor and/or control the security devices/systems (e.g., cameras etc.). The gateway device may also monitor and/or control other premises devices such as refrigeration devices, fuel tank devices, liquid di spending devices, or other point of sale (POS) devices Thus, the gateway device 102 may manage any type of device that it is coupled to.

As shown, the gateway device 102 may be in communication with a network, e.g., a wide area network (WAN), such as the Internet, 130. The gateway device 102 may be in communication with the WAN 130 via a router or modem that provides the WAN (e.g., Internet) connection. Alternatively, the gateway device 102 may itself include logic (e.g., circuitry such as an ASIC or FPGA and/or a processor and memory storing program instructions) to perform these wide area network connectivity functions. For example, the gateway device 102 may include a broadband modem for providing a communication link between the location and the Internet. The gateway device 102 may also act as a router (e.g., a wired and/or wireless router) which couples to the WAN 130 and premise devices at the location.

As also shown, the gateway device 102 may be in communication with a computer system (e.g., display 103) in the retail store or premises (e.g., in a wired or wireless fashion, as desired). For example, a manager or employee of the store or premises may use the computer system to perform various tasks related to the store premises, e.g., viewing security feeds, performing bookkeeping, etc. In some embodiments, the gateway device may be configured to manage the computer system. In one embodiment, the gateway device may monitor various programs that are executing on the computer system and/or the Internet traffic that the computer system is receiving or transmitting, among other possibilities.

Alternatively, or additionally, computer systems in the premises may be used to manage or monitor the various programs executing on the gateway device 102. For example, the gateway device 102 may provide status messages (e.g., containing reported information) or control messages (e.g., for controlling one or more devices) regarding the plurality of devices 120 of the location to the computer system. For example, an employee or manager of the location (e.g., the store) may monitor or control the various devices of the location using an application that executes on a computer system and which is in communication with the gateway device 102. For example, the gateway device 102 may include a web server that hosts a website used for these monitor/control functions. The computer system may execute a web browser and may visit the website (e.g., hosted by the gateway device or elsewhere) that is usable to manage the devices at the convenience store. Alternatively, a custom application may be executed by the computer system to manage the devices 120 via the gateway device 102. Note that while the separable display 103 is described as computer system (e.g., a desktop computer system), any type of system may be used, e.g., laptop computers, portable or mobile devices, such as cell phones, netbook computers, tablet computers, etc. In general, in this embodiment, the separable display 103 may be any device that is able to provide an interface to the gateway device for a user. For example, it may simply be a separate display that is able to display information provided by the gateway device (e.g., over a wireless network).

The computer system may be in communication with a server 140, which may be referred to as a management server (e.g., a cloud server, as described below). The management server 140 may be connected via the WAN 130, or may be in direct communication with the gateway device (e.g., without accessing the WAN 130), and/or both, as desired. The gateway device 102 may be in direct communication with the management server 140 to report information gathered by the devices or perform control actions, among other possibilities. A user may be able to configure the gateway device 102 directly (e.g., via a web site hosted by the gateway device or via an application executing on the computer system) or may be able to configure the gateway device over the WAN 130, via the management server 140.

As shown in FIG. 1 (and as discussed above), the gateway device 102 may be in communication with one or more servers 140 (e.g., which may be a single server or a server farm, as desired) over the WAN 130. The one or more servers 140 (which may be a "cloud server" or "cloud servers") may provide various functionality for the location (e.g., the store), the gateway device, and/or other devices or users, as desired.

For example, the management server 140 may be configured to receive and store information regarding the premise devices 120 (e.g., including the camera devices 125a and 125b) managed by the gateway device and possibly status information of the gateway device 102 or the location. The management server 140 may store data (e.g., the received information discussed herein, among other information) in cloud-based storage 145. In one embodiment, the management server 140 may store configuration information of the various premise devices 120, network status information of the connection between the management server 140 and the gateway device 102, etc. In one embodiment, the management server 140 may be configured to receive messages or images comprising information gathered from each of (or at least a subset of) the plurality of various premise devices 120 at the location and location-reported information for the various premise devices 120, e.g., in a database. The reported information may indicate a current condition of the premise device, a condition of the environment of the location near the premise device, any data measured by the premise device, etc. For example, the management server 140 may store a current image (and/or a history of images) for a first electronic camera device at the location. The management server 140 may also receive messages regarding various transactions performed by a first POS device at the location and store information regarding those transactions. The management server 140 may also receive messages regarding the fuel level in a first fuel tank at the location and store the current level (or a history of fuel levels) in response to the message. Other types of reported information or messages may be received by the management server.

In some embodiments, the management server 140 may receive messages indicating specific alarms or events associated with the premise devices managed by the gateway device. For example, the gateway device 102 may send information indicating when an image size extracted from a camera device exceeds a threshold or target value (e.g., based on known scene information content or otherwise); when the fuel level in a fuel tank is below a threshold level; when the liquid dispensing device is low on a respective liquid, out of ice, etc.; when the POS performs or attempts to perform a transaction above a certain level, etc. The gateway device 102 may also send information when a security alarm has been detected (e.g., when the store is broken in to), when an employee triggers an alarm (e.g., when the store is being robbed), etc.

In one embodiment, rather than the management server 140 receiving indications of a specific alarm, the management server 140 may be configured to automatically evaluate the incoming reported information to determine whether such conditions have arisen. For example, rather than receiving a message indicating that the image size is below a certain threshold/target value, the management server 140 may be configured to compare the current image size (e.g., as reported in a status message) with a threshold to determine if the camera is non-functional or is experiencing degraded imagery. Similarly, the management server 140 may be configured to compare a current temperature of a refrigerator with a threshold or target value temperature to determine if the refrigerator is operating adequately and/or if the temperature is above food safety levels.

Note that while the reported information is provided to the management server 140 by the gateway device 102, other entities or devices may provide reported information related to the location (e.g., a store) to the management server 140. For example, a third-party server may provide information related to a device located at the location of the gateway device 102 to the management server 140, and the management server 140 may receive that data and report it for the location of the gateway device 102 (e.g., as if it were provided from the gateway device 102). As one specific example, an energy company may store information related to the energy consumption of the location, but that information may not be available to the gateway device 102 (e.g., by being coupled to a smart sensor that monitors energy use of the location). Accordingly, a server storing that energy information may be configured to provide the information to the management server 140, which can then include that information in an interface to a user. Thus, a user may be able to view the energy use information from the management server 140 even though it was not provided via the gateway device 102. Accordingly, the management server 140 may be configured to aggregate information concerning a location from a plurality of sources, including the gateway device 102 and/or other entities that gather or store such data. As another example, a manufacturer of a device may send reported information (or alerts) based on schedules. For example, an ice machine manufacturer may send information to the management server to update the status to "replace filter" every on a periodic basis (e.g., every six months). This may be extended to any party or particular information related to the location (e.g., a device at the location). Further, weather information related to the location may be provided to the management server (e.g., from a weather service).

The management server 140 may also be configured to provide information related to the location to various users, entities, and/or devices (e.g., user devices). For example, the management server 140 may receive information gathered by the various premise devices 120 and may provide the information for display to client 150, e.g., on a website that may be visited by authorized users (e.g., users that are associated with the specific convenience store). Alternatively, or additionally, these users (or other devices) may execute programs on computer systems or devices designed to interface with the management server 140 to retrieve and provide the information for presentation for the user. In one embodiment, a manager of the location may be able to execute such a program or browse to a web site provided by the management server 140, to view the current status of the location, e.g., as reported by the various premise devices 120. For example, the manager may be able to quickly determine the fuel level in the fuel tanks of a convenience store, determine whether the food sold at the convenience store are currently at proper temperatures (and/or if they have been over a period of time, such as the last day, last week, last month, or any period of time specified by the user), determine the current prices of the gas sold by the convenience store, determine the number or amount of sales performed by the convenience store over various time periods (such as those described above, although they can be specified manually by the user), etc.

Note that the computer system (e.g., 103) inside of the location may similarly access the management server 140 (or the gateway device 102) to determine the status of the convenience store (e.g., based on the reported information), as desired. Thus, the gateway device 102 may monitor the status or condition of various premise devices 120 in the location (or generally various conditions within the location, e.g., as reported by premise devices 120), provide them to the management server 140, and the management server 140 may provide that information to various other entities or users, which may be local or remote to the location, as desired. Alternatively, the gateway device 102 may include web server functionality, and thus the gateway device may be accessible by client browsers located on the computer system or the management server 140.

Figure 2:
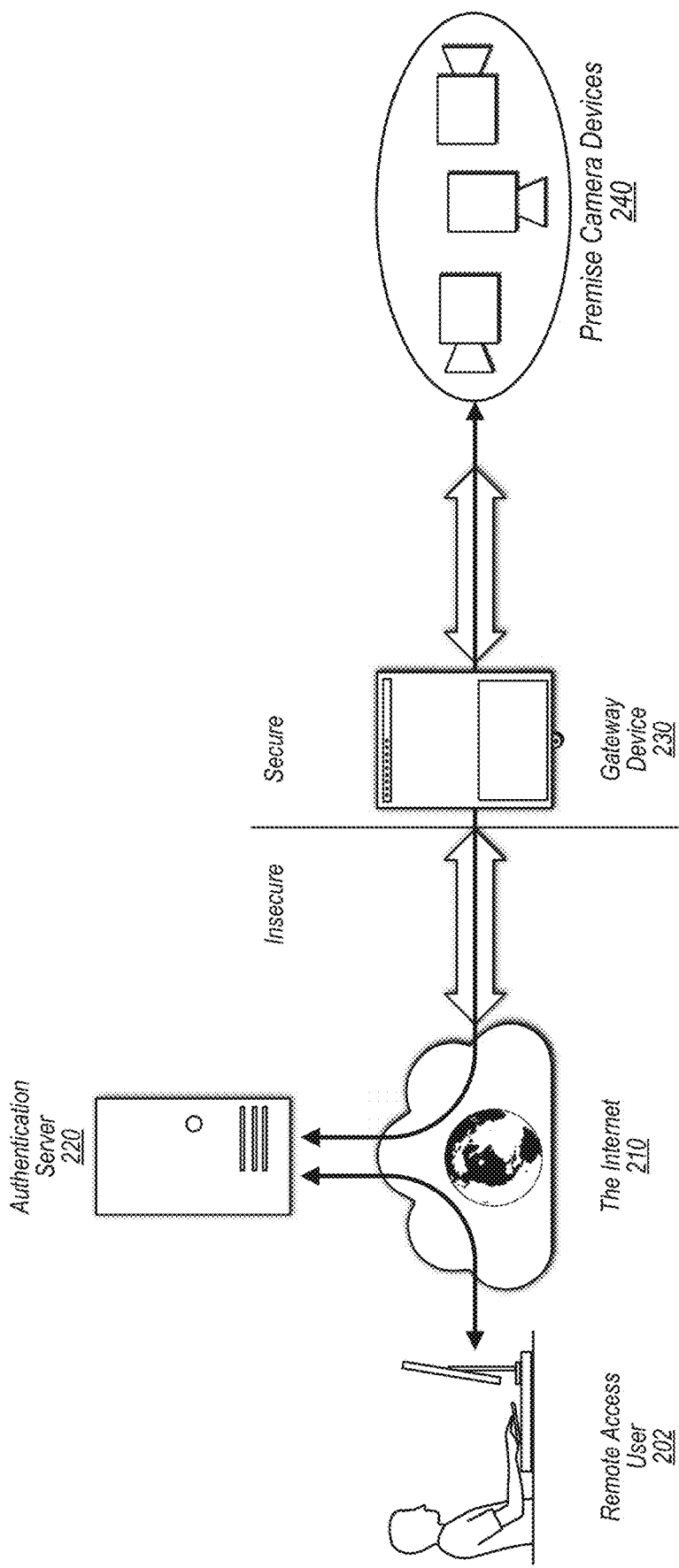
FIG. 2 illustrates a more simplified block diagram of the system of FIG. 4 showing connectivity, according to some embodiments.

FIG. 2—Secure Remote Access to Premise Camera Devices

In some embodiments, securely accessing premise camera devices from a remote location may include utilizing an authentication server. This authentication server can impose authentication methods independent of the characteristics of any particular premise device for which remote access is to be securely enabled.

FIG. 2 illustrates an exemplary system to initiate and perform a connection to a premise camera device with improved security.

As shown, FIG. 2 illustrates a remote access user 202, which is coupled to the authentication server 220 via a wide area network (e.g., the Internet 210). The gateway device 230 is coupled to the authentication server 220 via the wide area network (e.g., the Internet 210) and may provide security to the premise camera devices 240. Thus, access to one or more devices at the location (e.g., including device 240) may be controlled by the gateway device 230, which is in communication with authentication server 220. FIG. 2 also illustrates flow of communication among the various device in the system.

In the system illustrated in FIG. 2, a remote user 202 may authenticate with an authentication server 220. In some embodiments, the authentication server 220 may not act as an intermediary between the user 202 and the premise camera devices 240 after authentication. During this authentication, the origination network address of the remote user may be determined. Various user authentication methods can be employed because the process of authentication is no longer connected to the manufacture or characteristics of the premise camera devices 240 on the premises. For example, the user authentication may include a unique user name and password, uses two factor authentication (e.g., using a FOB, texting a cell phone of the user, using an application that provides a code refreshes periodically on a frequent basis, etc.), or any number of other methods for authenticating a user.

Note that the authentication of the user may be for different levels of access within the network at the premises. For example, the user may request access to full access to the network at the premises, e.g., so that the user may be able to interact with any device coupled to the gateway device 230 at the premises. This full level of access may be similar to that of a virtual private network (VPN) connection. However, the user may request (or only be allowed) limited access to the network and/or devices at the premises. For example, the remote user 202 may be a technician that is attempting to access/repair/update/upgrade a specific device or type of device at the premises, such as a credit card machine or one or more cameras. Accordingly, the authentication may be performed for only accessing that device or that type of device. In general, any level of access may be provided that is desired, e.g., a single device, a plurality of devices (such as of the same type), a plurality of specific devices, all devices, etc.

In some embodiments, the level of access may be requested and/or established as part of the authentication procedure. For example, the authentication process may involve the remote user 202 providing an indication of the device or set of devices the user wishes to access and the authentication server 220 may determine which of the requested devices will be accessible, which may be indicated back to the remote user 202. Alternatively, or additionally, the remote user 202 may have a preconfigured set of devices that are allowed for that user. In other words, the authentication procedure may only be to establish the identity of the remote user 202 and the authentication server 220 and/or gateway device 230 may already store information that indicates which level of access or which set of device(s) that user is authorized to access.

As part of the authentication procedure, the authentication server 220 may determine or receive the origination address (e.g., an IP address) of the remote user 202. The origination address may be provided in a message from the remote user 202. Alternatively, or additionally, the authentication server 220 may determine the origination address based on messages received from the remote user 202.

In response to authentication of the user 202, the authentication server 220 may send one or more secure messages to a security device (shown as gateway device 230) at the premises. As noted above, the gateway device 230 may provide firewall functionality as well as other functions that allow the presently described embodiments to be implemented.

In some embodiments, the one or more messages between the authentication server 220 and the gateway device 230 may include the origination address of the request from the authenticated remote user 202.

Additionally, the one or more messages between the authentication server 220 and the gateway device 230 may include an indication of one or more devices that the user 202 is allowed to access. This indication may specify the identities of each of the devices the user is able to access. Alternatively, or additionally, the indication may specify a type of device or set of devices that the user 202 is allowed to access (e.g., all credit card machines, all point of sale devices, etc.). As another possibility, the indication may simply specify a level of access (e.g., full access, partial access, etc.).

In some embodiments, rather than the authentication server 220 specifying the devices or level of access of the user 202 in the one or more messages, the gateway device 230 may store information about the user 202 that associates specific devices with the user 202. This information could be added, modified, or removed at any time, e.g., from the authentication server 220 or another server, as desired. In some embodiments, the gateway device 230 may receive the information specifying the allowed set of devices or level of access from the authentication server 220 such as when a new user is authenticated and may store that information for future reference, e.g., when the user logs in again. Accordingly, the authentication server 220 may only send an indication of access-level (or specified set of devices) only when necessary, e.g., first time authentication or when the access-level changes.

Upon receipt of the secure message, the gateway device 230 may allow connections from the address of the authenticated user 202. The gateway device 230 may not allow connections from addresses that have not been indicated by the authentication server 220. In some embodiments, the gateway device 230 may send an acknowledgement message back to the authentication server 220 indicating completion and/or preparation for the remote access by the remote user 202. For example, an acknowledgement may be provided initially upon receiving initial messages from the authentication server 220. Additionally, or alternatively, the acknowledgement may be provided once the gateway device 230 has completed set up of the allowed access for the remote user 202.

The gateway device 230 may also start a timer (e.g., ephemerality timer) that specifies a time length that the user 202 can access device(s) at the location. For example, the timer may have a length of 10 minutes, 20 minutes, 30 minutes, 1 hour, 2 hours, etc. In some embodiments, the timer may have a shorter duration that is refreshed with activity. For example, the timer may be configured to expire if there is no activity within 1 minutes, 2 minutes, 5 minutes, 10 minutes, etc. Additionally, the timer may also have a maximum duration that, regardless of activity or inactivity, causes the authentication of the user 202 to expire.

While the timer is not expired, the gateway device 230 may enable forwarding of connection data between the authenticated user 202 and one or more devices within the network at the premises. As noted above, the user 202 may have different levels of access, so the gateway device 230 may only allow the authenticated user 202 access to those devices prescribed by the level of access or set of device(s) that the user 202 is allowed to access. The gateway device 230 may not allow any connection between the user 202 and any devices not indicated by the authentication server 220 (or otherwise specified or stored by the gateway device 230). In some embodiments, the gateway device 230 may start a proxy service to secure data exchanged between the user 202 and the premise camera devices 240 (where the premise camera devices 240 is one or more devices that the user 202 is allowed to access).

In some embodiments, as part of the relaying of traffic between the user 202 and the premise camera devices 240 (among other devices that the user 202 may be allowed to access), the gateway device 230 may perform address translation such that any connection from the remote user 202 may appear to originate with the gateway device 230, such that the premise camera devices 240 remains isolated from connections from remote addresses throughout the remote access session. For devices that are configured with functionality to restrict access based on origination address (e.g., or only communication within the local network), this address translation will allow remote access to the premise camera devices 240.

Upon receipt of a preparation completion or acknowledgement message from the gateway device 230, the authentication server 220 may provide to the authenticated user 202 an indication allowing remote access. In some embodiments, the indication may include a link to initiate remote access. For example, the indication and/or link may include an address of the gateway device 230, so that the user 202 can communicate directly with gateway device 230 (and ultimately to the device 240) without using authentication server 220 as an intermediary. In some embodiments, the authentication server 220 may determine the address of the gateway device 230 during the exchange of messages, although the authentication server 220 may have already stored such information previously.

Accordingly, the user 202 may then communicate with the one or more devices (including premise camera devices 240) for the length of the remote access session, e.g., via the gateway device 230.

Upon completion of the remote access session, the authenticated user 202 may inform the authentication server 220, which can then send another message to the gateway device 230 indicating completion of the session, e.g., and that all further communications should be disabled. The remote access session may also be ended by the timer described above in an automatic fashion, thus ensuring that the access to the premise camera devices 240 (or other devices associated with the remote access session) is terminated and does not last for an indefinite period of time, allowing for enhanced security within the network at the premises. Thus, even when the user 202 does not log off or terminate the session manually (or is unable to do so for some reason), the connection may be terminated automatically, e.g., based on the timer.

Figure 3:
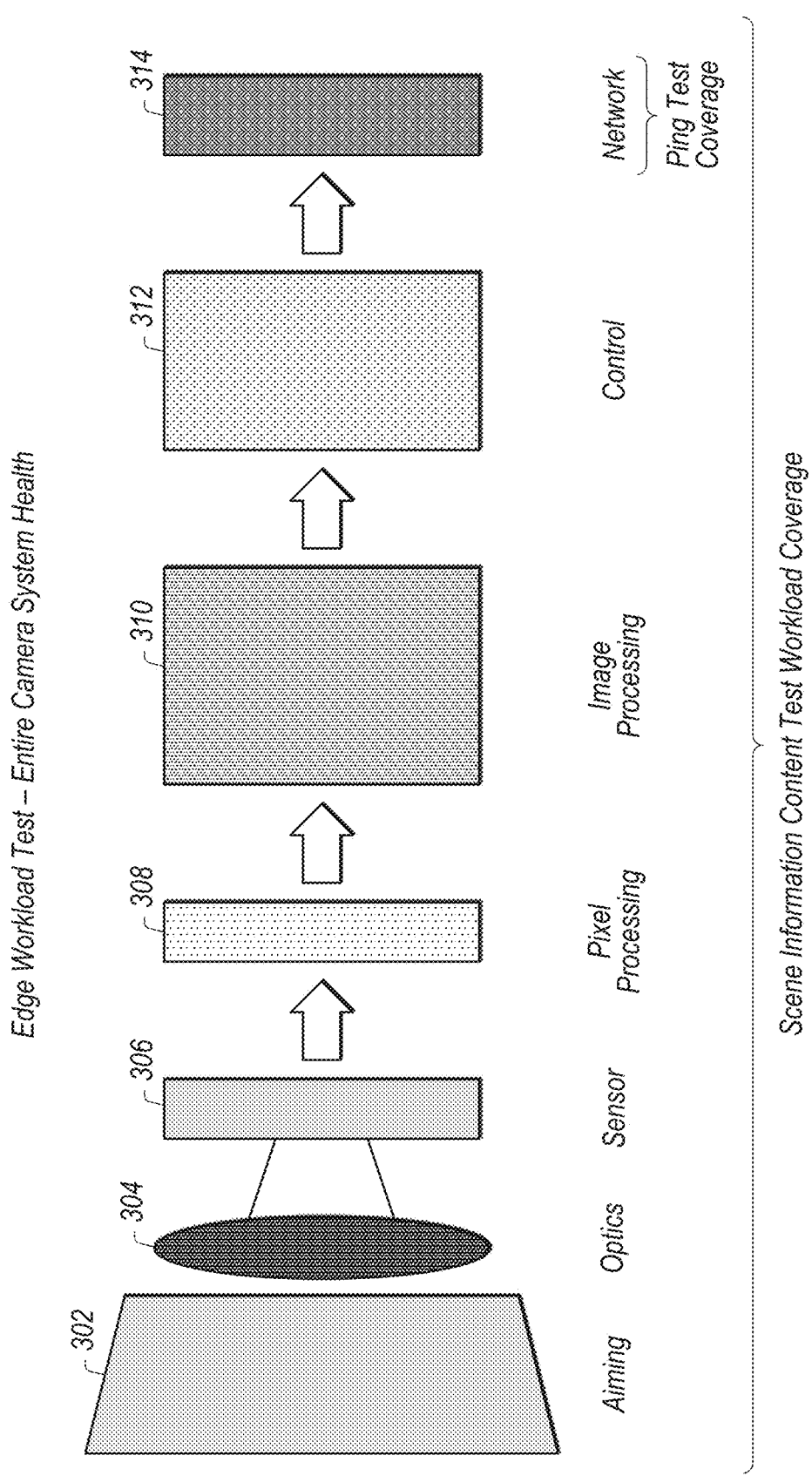
FIG. 3 illustrates different workload tests and associated coverage of a camera system, according to some embodiments.

FIG. 3—Camera System Workload Tests and Coverage

FIG. 3 illustrates an example camera system and its subsystems in addition to outlining workload test coverage (to determine camera system health) with respect to the entire camera system or certain subsystems (e.g., the network connection).

As illustrated in FIG. 3, a camera system may include various subsystems including (but not limited to) aiming 302, optics 304, sensor 306, pixel processing 308, image processing 310, control 312, and network 314. Each subsystem performs a particular function in the camera system to provide or assist in image gathering and in the case in which a certain subsystem fails, the entire image pipeline may be affected. For example, if a criminal spray-paints over the receiving optics 304 of the camera, the sensor 306 may be affected in regard to how much light it collects. In some instances, the aforementioned spray-paint obstructing the receiving optics 304 could result in a drastically reduced photon count for the pixels of sensor 306. This in turn may lead to imagery that has low scene information (faint or blurred imagery).

Furthermore, if a subsystem such as sensor 306 experiences a catastrophic failure, this may in turn result in imagery that has very little or no discernable scene information (e.g., a blank or black image). Consequently, this imagery may not be useful to any user wishing to view imagery from the premise camera. Therefore, the monitoring or determining of a camera systems health over the entire camera system (including all of its subsystems) may be of particular importance to a user wishing to view or analyze imagery from the camera system.

One method for monitoring or determining a camera's health may be to "ping" the camera by sending a small network message (e.g., a ICMP "echo request" standard message) and waiting a short period of time for the camera to return an "echo reply" response to the message. This "ping" and "echo request/reply" could indicate to the user that the camera system is still functioning with regard to being connected to the network and capable of receiving and transmitting said echo requests/replies respectively. However, one disadvantage is that the detection of the network response message, while indicating nominal operation of the network subsystem 314 of a camera, is not a reliable indication that the entire camera system is fully functional.

For example, as discussed previously in regard to compromised optics (such as spray paint covering the camera's receiving optics), the camera's other subsystems may still be functioning properly and produce imagery available to the network. In other words, while the optics may be inadvertently collecting degraded imagery, the pixel processing 308, image processing 310, control 312, and network 314 may be unaffected and therefore continue to process and deliver the degraded imagery to the user via the network 314. Thus, the "ping" test coverage as described may not indicate the health of the overall camera system but could be indicative of the functionality of the network subsystem.

Another method for detecting camera health may be to periodically extract images or streams of images from one or more premise cameras, and to consider the successful collection of a valid image as an indicator of camera health. However, again, a disadvantage of this method is the failure to detect complete camera health. For instance, in the aforementioned example in which a camera whose lens has been spray-painted over, the camera will still reliably generate a stream of valid, time-stamped images. However, these "valid, time-stamped images" will likely be degraded or distorted in some aspect and of little particular use considering the camera's intended purpose. Additionally, other camera health issues, such as partial or complete failure of the image sensor 306, pixel processor 308, or image processor 310 may not be detected by this method.

An additional method for detecting camera health may be to export image or image stream data from the local premises to a "cloud" or remote server for the purpose of performing more sophisticated analysis of the images. However, this sophisticated remote analysis may require a network connection with superior capacity to support the export of image stream data. In the example of a premise with a large number of cameras, the network may have insufficient capacity to support this method. For example, a premise covering a large geographic area may utilize numerous cameras for security and/or surveillance purposes. In some instances, some of these cameras may produce high-definition (HD) images which require more computing space to store (locally or remotely) and more network bandwidth for the transmission of images to a remote user than is available. Therefore, the combination of many cameras in effect producing a plurality of space consuming images may strain the available local or remote computing resources, available memory or network capacity.

Camera Health Determination Based on Local Analysis of Scene Information Content Various embodiments are described of a system and method for monitoring and determining camera system functionality through analysis of locally extracted scene information content.

Embodiments described herein may provide a much more reliable mechanism for determining faulty or non-useful camera feeds. For example, by extracting and analyzing content at the location containing the premise camera devices, a user may be able to more efficiently determine faulty or non-useful camera feeds by not having to utilize the network to which the feeds are connected which may further lack the capability or capacity to provide said analysis.

Some embodiments may include a non-transitory computer readable storage medium comprising program instructions executable by at least one processor of a network edge device. The network edge device may then determine one or more image sizes of the one or more images and further compare the one or more image sizes to one or more threshold values. In some embodiments, the one or more threshold values may correspond to one or more threshold ranges. For example, the threshold values may correspond to upper and/or lower bounds (e.g., thresholds) of one or more threshold ranges of stored, typical or algorithmically determined image sizes which may correspond to properly functioning cameras (e.g., operating within normal parameters). Accordingly, the network edge device may be configured to generate an alert if the one or more image sizes exceed or are lower than the threshold/target value or fall outside (e.g., extend beyond) the threshold ranges, according to some embodiments. In some embodiments, the one or more image sizes may correspond to one or more sub-regions of the one or more images. For example, a first image size of the one or more image sizes may correspond to a first sub-region of a first image of the one or more images. In other aspects, the alert may be generated if the one or more image sizes are approximately equal. Additionally, the network edge device may be a network edge security appliance (NESA) and may further comprise internal memory storage of typical or algorithmically determined image sizes and alert thresholds (e.g., target values/thresholds correspond to one or more respective ranges of image sizes), according to some embodiments. In some embodiments, the threshold or target value may correspond to a minimum or maximum image size from a range of image sizes. In some embodiments, the program instructions may cause the network edge device to receive one or more images originating from one or more camera devices and determine if the one or more images are compressed. If the network edge device determines that the one or more images are not compressed, the network edge device may be further configured to apply a compression algorithm to the one or more images.

Figure 4:
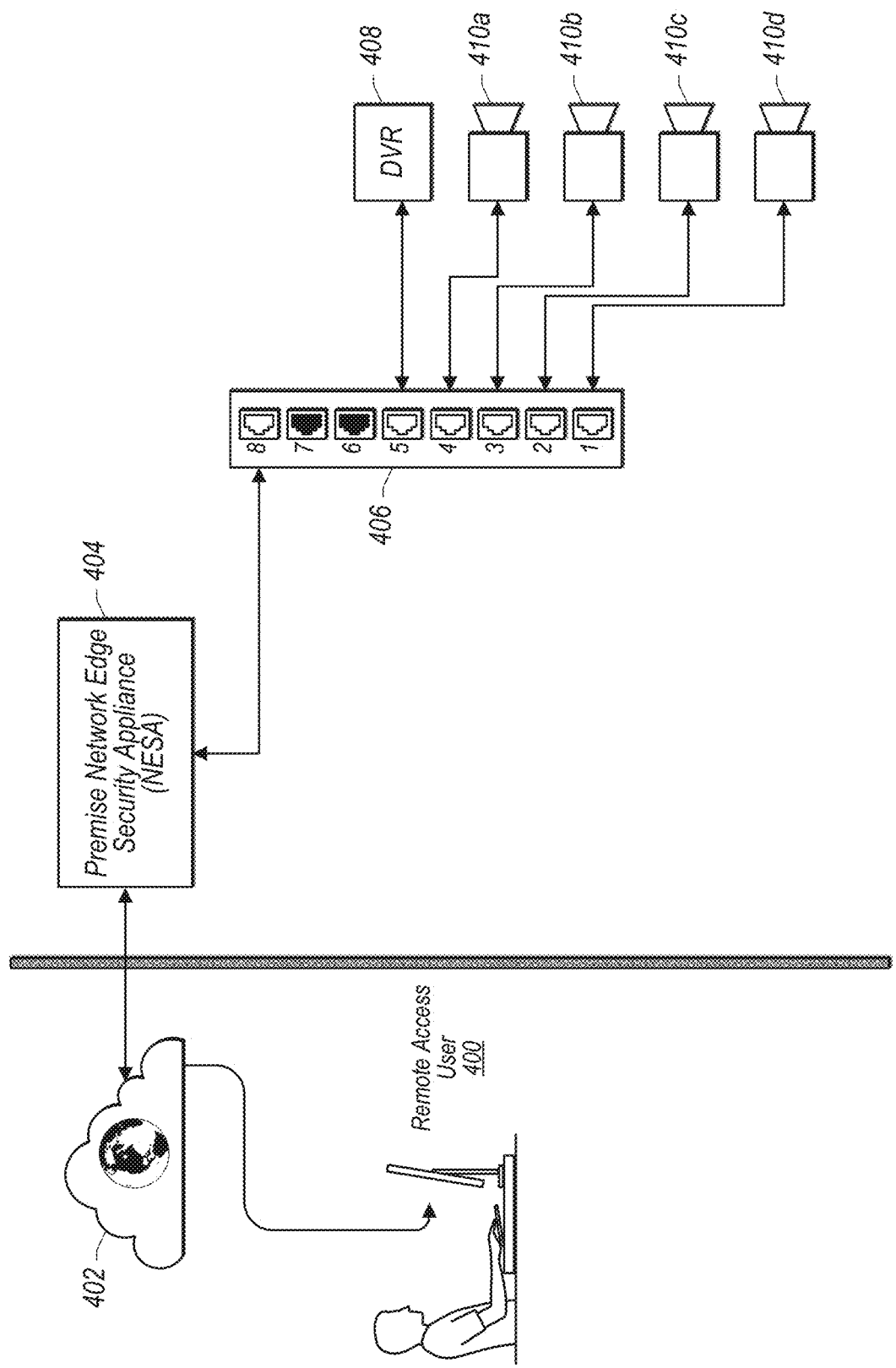
FIG. 4 illustrates a system which incorporates a network connected Premise Network Edge Security Appliance coupled locally with one or more camera systems and digital video recorders (DVRs), according to some embodiments.

FIG. 4—Local Premise Network Edge Security Appliance

FIG. 4 illustrates a system which incorporates a network connected Premise Network Edge Security Appliance coupled locally with one or more camera systems and/or digital video recorders (DVRs), according to some embodiments.

As shown in FIG. 4, the camera system including the camera and DVR 408 may be in communication with a network, e.g., a wide area network (WAN), such as the Internet, 402. The cameras 410a-d and/or DVR 408 may be in communication with the WAN 402 via a router, modem, or Ethernet switch device 406 that provides the WAN (e.g., Internet) connection. Alternatively, the DVR 408 may itself include logic (e.g., circuitry such as an ASIC or FPGA and/or a processor and memory storing program instructions) to perform image analysis functions. For example, the DVR may include GPU (graphics processing units) and software configured to perform a number of image analysis routines on extracted imagery from the cameras.

As also shown, the DVR 408 may be in communication with user and computer system (e.g., Remote Access User 400) locally or remotely via the network connection to the internet (e.g., in a wired or wireless fashion, as desired). For example, an employee of the premises may use the computer system to perform various tasks related to the security of the premises, e.g., viewing security feeds, performing bookkeeping, etc. In one embodiment, the remote user 400 may monitor various programs that are executing on the computer system and/or the Internet traffic that the computer system is receiving or transmitting, among other possibilities. In some embodiments, the local premise may additionally comprise a Network Edge Security Appliance (NESA) 404.

The Network Edge Security Appliance (NESA) 404 may be a device that is configured to couple to a wide area network, such as the Internet 402, and also couple (either wired or wirelessly via a router, modem, or Ethernet switch device 406) to one or more camera devices or digital video recorders (DVRs), and which is configurable with one or more application programs to monitor and/or control the one or more camera devices and/or DVR 408. In some embodiments, the NESA 404 and/or DVR 408 may be located proximate to the gateway device 102 of FIG. 1 (e.g., on the local premise) and may be similarly coupled to various premise devices 120 including cameras 120a and 120b via access to local devices 110. Additionally, or alternatively, the NESA 404 may also be coupled to both the premise camera devices 240 (directly or via a DVR) and gateway device 230 of FIG. 2 according to some embodiments. In other words, the NESA 404 may be configured to communicate and perform its monitoring and controlling functions in concert with various premise devices 120 and gateway device 102 of FIG. 1 and the premise camera devices 240 and gateway device 230 of FIG. 2. As another possibility, the NESA 404 may be included as a part of the gateway device 102 of FIG. 1.

In some embodiments, the NESA 404 may implement software with program instructions executable by at least one processor of the NESA 404. The program instructions may cause the NESA 404 to receive one or more images originating from one or more camera devices and determine if the one or more images are compressed. If the NESA 404 determines that the one or more images are not compressed, the NESA 404 may be further configured to apply a compression algorithm to the one or more images. The NESA 404 may then determine one or more image sizes of the one or more images and further compare the one or more image sizes to a threshold or target value. Additionally, the NESA 404 may be configured to generate an alert to one or more other connected (wirelessly or wired) other devices if the one or more image sizes exceed or are lower than the threshold or target value or extend beyond (e.g., fall outside) one or more specified or algorithmically determined ranges of acceptable image sizes. According to some embodiments, the threshold values may correspond to outer limits of the range of acceptable image sizes.

Figure 5:
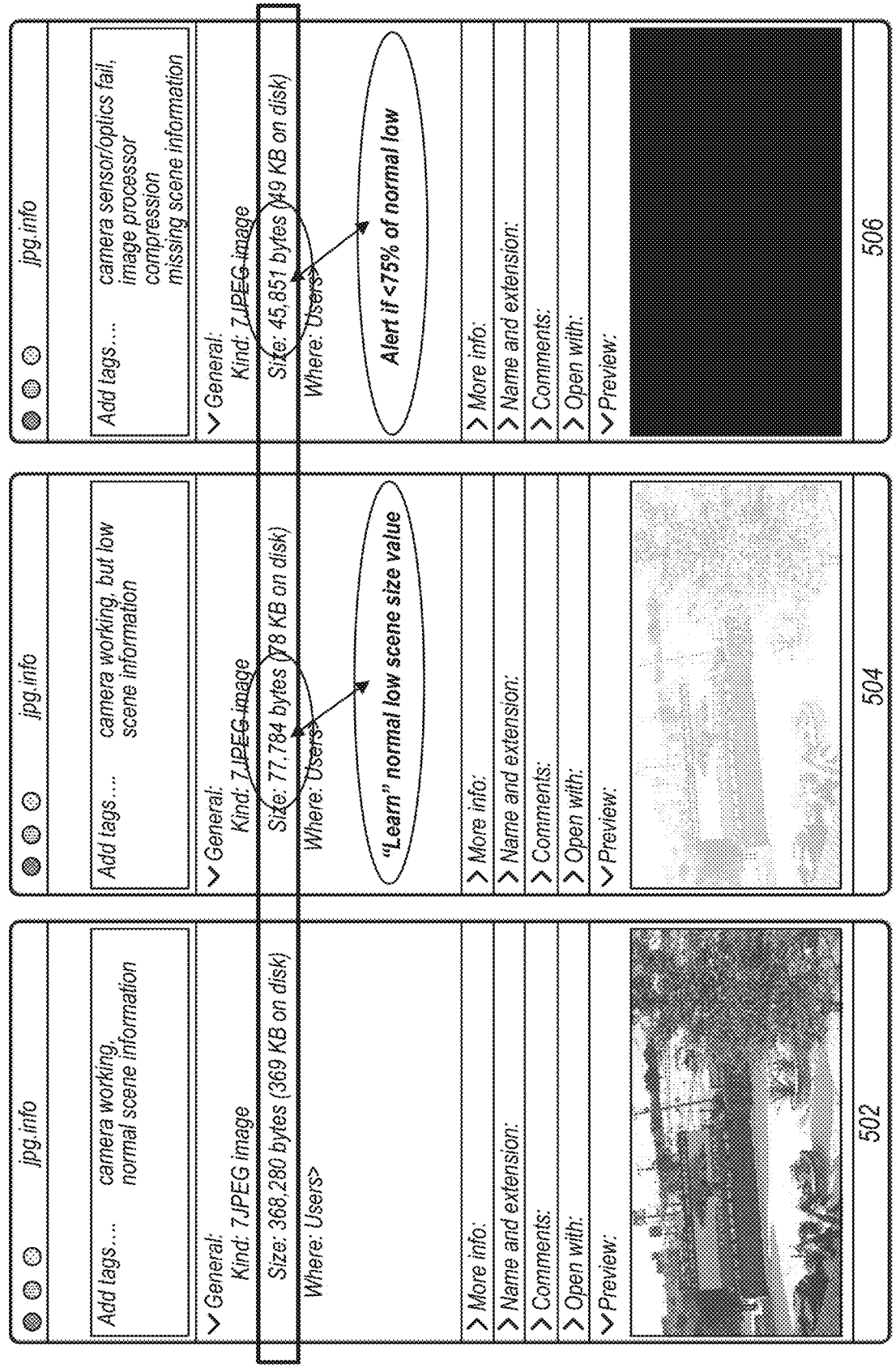
FIG. 5 illustrates different camera scenes and their respective scene information content and image file sizes, according to some embodiments.

FIG. 5—Varying Camera Scene Information Content and Image File Sizes

FIG. 5 illustrates different camera scenes and their respective scene information content and image file sizes, according to some embodiments. For example, the left most image 502 of FIG. 5 displays an example camera image from a working camera viewing a normal or typical scene environment. As shown, the scene contains sufficient information which may allow a user to examine or identify certain features in the image. For example, if a user extracted and examined image 502, the user may be able to identify certain features in the image such as a billboard sign, a tree, or telephone poles. Moreover, if the user was particularly familiar with geographic landmarks, they may be able to determine the location of the camera as well as the direction it is facing. Additionally, the image file size is also shown as 369 KB (kilobytes) on the disk. While image file sizes may vary depending on the scene, the 369 KB image file size for image 502 may be considered a "normal" or "typical" file size for an image generated by that particular camera system.

In contrast to image 502, the image in the center (image 504) of FIG. 5 displays an example image with low scene information (e.g., lower than that of image 502). For instance, image 504 may be displaying weather conditions (e.g., a snowstorm or blizzard) which, due to the exposure of similar imagery (e.g., approximately equal photon counts) exposed to the pixels across the majority of the camera's sensor, this may ultimately result in low scene information. In other words, due to the prevalence of snow in image 504, for example, other details of the image may be harder to discern or examine and therefore the image may contain less scene information than that of normal image 502. In this example, a user examining image 504 may have a more difficult time discerning certain features such as the billboard sign, telephone poles, and vegetation in the image. In effect, image 504 may be considered as having low scene information as compared with normal image 502 and accordingly may have a smaller image size than that of normal image 502. For example, as shown above image 504, the image file size is listed as 78 KB on disk as compared to the 369 KB image file size of normal image 502.

Furthermore, a user with knowledge of this size discrepancy between a normal scene and a low information scene may wish to store or learn this low information file size locally as a reference point or threshold (e.g., target value) with which to compare future image sizes to. According to some embodiments, a user may store a range of image sizes with upper and lower size thresholds to refer or compare additional images to. In doing so, the user may be able to determine that a camera is generating low information images simply by comparing the generated low information image file sizes to that of a previously stored low information image file size.

FIG. 5 also depicts image 506 on the right which shows a blank (or black) image. This image 506 may contain very little to no discernable scene information and may further appear as a blank (or black) image to a user (e.g., user 202 or remote access user 400) viewing said imagery. Numerous scenarios could lead to such an image being generated by the camera system. For example, camera optics or sensor failures, image and pixel processor failures, compression issues, and missing or altered (e.g., spray paint) scene information may all be possible causes of producing an image like that of image 506. Moreover, the image file size for such an extreme (e.g., very low scene information) image may be even lower than the low scene information of image 504 and drastically lower than that of normal image 502. For example, as shown above image 506, the image file size is listed as 49 KB on disk as compared to the 369 KB image file size of normal image 502 and the 78 KB image file size of low scene information image 504.

As discussed above in regard to the discrepancy of image file sizes of normal and low scene information imagery, a user with knowledge of this size discrepancy between a normal scene, a low information scene, and a drastically low information scene may wish to store or learn this image file size locally as a reference point, threshold, or target value with which to compare future image sizes to. In doing so, the user may be able to determine that a camera is generating drastically low information images or has experienced a full system (or subsystem) failure simply by comparing the drastically low information image file sizes to that of a previously stored low information image file size. Accordingly, a user viewing this imagery may determine that the camera system (or at least one of the camera's subsystems) is non-functional, faulty, or is experiencing a failure of some nature.

Furthermore, the user may also wish to generate an alert if any generated imagery results in image file sizes less than a certain target value, reference point, or threshold (e.g., outside a range of acceptable image sizes). For example, if the low information scene image file size of image 504 (78 KB) was stored as a reference point, a user may wish to generate an alert if a future image file size is less than 75 percent of this reference point. In other words, if image 504 was determined to be a typical low scene information image (with corresponding image file size of 78 KB), a user may wish to generate an alert if any image generated falls below a 75 percent threshold or target value regarding file size. For example, in the case of image 506 which contains drastically low scene information and has an image file size of 49 KB, an alert may be generated under aforementioned threshold (e.g., target value) conditions since the image file size of image 506 is less than 59 KB (approximately 75 percent of 78 KB, the image file size of typical low scene information image 504).

Moreover, this alert may be generated automatically as part of the function of the network edge security appliance. For example, as discussed above in regard to FIG. 4, the NESA may include a storage medium comprising executable program instructions which configure the NESA to generate an alert to one or more other connected (wirelessly or wired) other devices if the one or more image sizes exceed or are lower than the threshold/target value or lie outside a range of acceptable image sizes.

Figure 6:
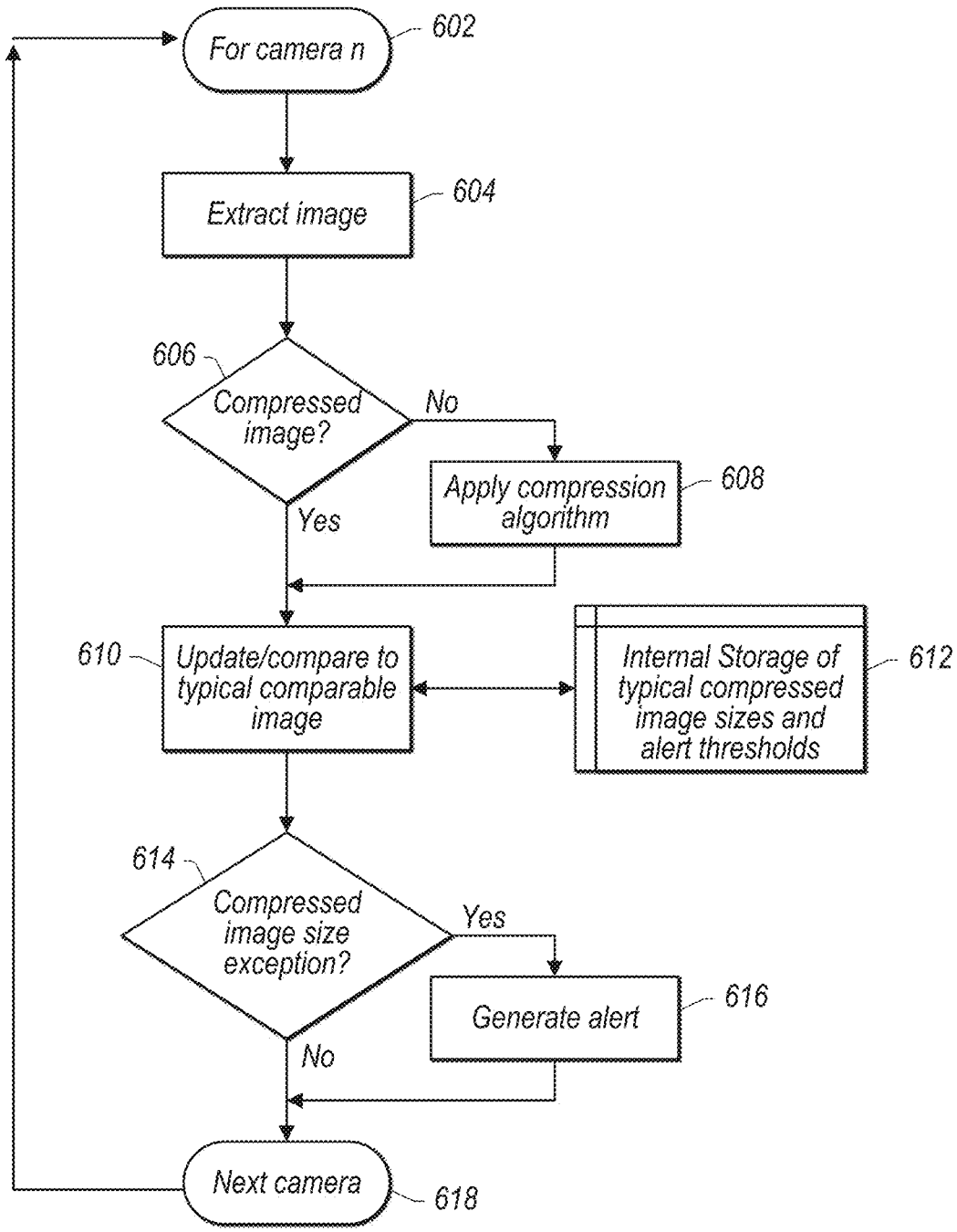
FIG. 6 is a flowchart for locally analyzing scene information content and generating an alert if a threshold or target value condition is encountered, according to some embodiments.

FIG. 6—Method of Local Analysis of Scene Information Content as Indicator of Camera Health FIG. 6 is a flowchart illustrating a method for locally analyzing scene information content and generating an alert if a threshold or target value condition is determined, according to some embodiments.

First, at 602, a camera and its associated feed or imagery is selected by a local network edge security appliance (NESA) or user. The selection may be made randomly, based on a pre-determined list, or chosen by a user based on knowledge of the particular camera system among other reasons. For example, the NESA may comprise program instructions that when executed select a certain camera system based on a list of cameras.

Next, at 604, the local NESA or user may periodically extract images from one of a plurality of cameras. In other words, the NESA may request an image from the camera system to be sent via the network (or other electronic means) to the NESA. Alternatively, the camera system may be programmed to transmit images on a regular basis. For example, the camera system and/or camera controlling device may transmit a "test image" every 30 minutes to test the functionality of the camera system, its subsystems, as well the network's functionality in regard to sending or receiving imagery from the camera system.

At 606, the NESA may determine if the image received is a compressed image. For example, the NESA may be programmed to identify if an image is in a compressed format based on header or other information contained in the received image. Additionally, the NESA may then note the size of the compressed or non-compressed image and the camera and time of image collection.

Alternatively, if the NESA determines that the image is not in a compressed form as described in 606, the NESA may be further configured to optionally compress the image in 608. For example, the NESA may be configured to execute program instructions which may apply a compression algorithm to the imagery which may further result in a compressed image, according to some embodiments.

At 610, the NESA may compare the extracted image to a typical comparable image. In some embodiments, this typical comparable image may have been previously stored in memory locally or in a network or cloud storage device. The NESA may further note the extracted image size and compare the extracted image size to the image size of the typical comparable image. This comparison may require the NESA to perform 612 in which it accesses stored typical maximum image size, typical minimum image size, and/or typical variation in image size from internal storage. These internal storage devices may include typical image sizes (or ranges of image sizes) based on their scene information content and may further include alert thresholds/target values (which may correspond to upper or lower bounds of a range of acceptable image sizes) with which to consider in the comparison.

In some embodiments, the internal storage may include information regarding scene sub-elements to being considered. In other words, the comparison of 610 may include examining a scene image by subregion, or detecting scene elements that should be present using techniques of scene classification and analysis. For example, in some embodiments, if the left side of a camera image includes a specific scene element of importance, sub-regions of the image may be extracted and the method of FIG. 6 could be applied to only a sub-region of a scene. For example, a respective image size of one or more image sizes may correspond to a respective sub-region of a respective image of the one or more images.

In 614, the NESA may determine if the image size, when compared to an appropriate typical image size, is an exception. For example, the NESA may determine (upon comparison of the image sizes) that the extracted image size is below a minimum threshold or target value based upon a typical minimum image size. This image size threshold or target value may apply to a particular camera or scene that camera is viewing. Additionally, in some embodiments, the NESA may determine through comparison of multiple extracted images that the image size has stopped changing which may indicate that the camera or associated sub-system (such as the optics or sensor) is faulty. When extracting imagery from a live and fully functional camera system feed, successive extracted images will have varying image sizes due to the nature of the changing scenery. For example, a camera viewing a dark or low light scene (e.g., morning or night) may produce an image that has a image size smaller than that of which the camera would produce later in the day with a more illuminated scene (e.g., daylight hours) which in turn may have a larger image size. Thus, under most normal operating conditions, the NESA may expect image sizes to vary with each successive image extraction. Accordingly, if the image sizes remain the same or are approximately equal, the NESA may determine that there is a fault in the camera system or subsystem. For example, if the camera sensor fails, this may produce a blank (or black) image when extracted. Accordingly, the image size of multiple blank images may be the same or very close in size and therefore indicate (or generate an alert) to the NESA that there is a fault based on the unchanging image size.

Moreover, in some embodiments, the NESA may be configured to determine an image size exception (and further generate an alert, if necessary) if the image size has changed significantly over time (e.g., using a moving window, minimums, maximums, etc.). For example, in certain weather conditions such as a snowstorm, snow and/or ice may build up or be deposited in front of or on the camera's exterior optics which may cause the camera's imagery to degrade (e.g., become blurred, less clear) over time. In turn, this may cause the image file size to change over time with the degrading imagery. Furthermore, the NESA may be configured to detect such a change in imagery if the image size begins to change over time. In some embodiments, the NESA may store different or numerous thresholds (e.g., target values) with which to compare received imagery to. For example, during daylight hours, the NESA may use a daylight threshold or target value for comparisons to imagery received during daylight hours and similarly a night time threshold or target value for the imagery received during nighttime hours. This utilization of different thresholds/ target values or ranges of acceptable image values/sizes at different times may be of particular relevance in determining image file size exceptions over the course of an entire day. As one example, occasionally imagery that has been locally extracted may not contain sufficient visual information such that it exceeds a certain threshold value or range. For example, if the NESA continued to use a daytime threshold or target value for comparison of nighttime imagery, the NESA might inadvertently generate an alert due to the difference in normal daytime imagery compared to that of normal nighttime imagery. In other words, the image file size of the nighttime imagery may fall below the day time threshold or target value and potentially generate a non-useful alert. In some embodiments, the NESA may utilize various image processing and/or machine-learning techniques and algorithms in its analysis or comparison of received imagery and stored typical imagery.

In some embodiments, the NESA may be configured to analyze the standard deviation of imagery (e.g., the standard deviation of the pixel values/counts of the entire image or sub-regions of the image) to detect low scene information content (e.g., mostly monotone) images. This in turn may allow the NESA to generate an alert if the derived standard deviation value is below a threshold or target value (e.g., a stored target standard deviation value) thus giving an indication of camera system failure, according to some embodiments. According to some embodiments, the NESA may be configured to algorithmically determine one or more image size thresholds or ranges corresponding to typical image sizes associated with properly functioning cameras. Additionally or alternatively, the NESA may be configured to further analyze the typical image sizes to determine a standard deviation value corresponding to size variations in the images. Accordingly, this standard deviation value may also be used as a threshold to determine if a size variation for a received image size fall outsides acceptable ranges (e.g., exceeds the standard deviation value).

Furthermore, in some embodiments, the internal storage may contain information regarding specific scene features in the camera's field of view. For example, a certain subregion of a camera's imagery may view (and generate imagery of) an area or feature of particular importance such as a point of sale (POS). Moreover, the NESA or user viewing the imagery may wish to be alerted if, upon analysis and/or comparison of past and present imagery, the feature/area of particular importance is absent in the imagery. For example, if some object such as a large vehicle in the field of view (or the camera lens has been spray-painted over) is obstructing the view of said important features, the NESA may generate an alert indicating the area or feature of particular importance is not currently under surveillance by the camera system.

Next, in 616, the NESA may generate an alert based on the existence of an image size exception as detailed above in regard to step 614. For example, if the NESA determines that a image file size exception exists through comparison of the received image file size with a stored typical image file size, the NESA may be configured to transmit an alert message or signal to a remote device or user (e.g., remote access user) via a local device (e.g., a gateway device) as described in reference to FIGS. 1 and 2. Furthermore, the alert may be triggered or generated automatically through use of pre-programmed software or instructions executed by the NESA. For example, the NESA may be configured to automatically transmit or generate an alert message or signal upon determining that a received image size exceeds a corresponding threshold or target value.

Alternatively, if the NESA has not determined that there is an image size exception as detailed in 614, the NESA may accordingly proceed to 618.

In 618, the NESA may repeat 602-616 as outlined above for another camera on the premise until all cameras being monitored have been checked according to the method outlined in FIG. 6. Additionally, after all cameras on the premise have been checked via 602-616, the NESA may start the process over again on the first camera that it performed the method on. In other words, the process of checking or verifying camera health based on scene information content may be a continual process that starts over again once all cameras have been checked, accordingly to some embodiments. Additionally, or alternatively, the process of checking the plurality of camera systems may be performed at certain pre-determined intervals or be timer-based, according to some embodiments.

Furthermore, in some embodiments the NESA may be able to perform automatic comparison, threshold, or target value determination through use of pre-loaded software or programmed instructions. For example, the NESA could have a stored nominal image size and through use of its software, automatically compare a newly received image's size to the stored nominal image size.

According to some embodiments, one or more images (e.g., multiple images) may be extracted in 604 from the same camera n at the same time. Additionally or alternatively, images from one or more other premise cameras may be extracted in 604 at the same time as being extracted from camera n, according to some embodiments. Moreover, one or more images may be extracted from different cameras at different times, according to some embodiments.

In some embodiments, the one or more premise cameras may be situated or located at a particular location or vantage point so as to view capable of viewing a particular scene. Additionally or alternatively, the one or more premise cameras may be capable of changing their vantage point or field of view so as to view a different scene or a subscene of the current scene. For example, the one or more premise cameras may be integrated with optical or positioning components (e.g., lens modules, motors, servos, and/or actuators) that may allow them to zoom, pan, or tilt to view different scenes and/or fields of view. In other words, the one or more premise cameras may be capable of altering their orientation, location, or internal positioning of optical components so as to view different scenes or attaining a different field of view.

According to some embodiments, imagery that has been locally extracted may not contain sufficient visual information such that it exceeds a certain threshold value or range. For example, some embodiments may include a non-transitory computer readable storage medium comprising program instructions executable by at least one processor of a network edge device. The program instructions may cause the network edge device to receive one or more images originating from one or more camera devices. Furthermore, the program instructions may cause the network edge device to, for respective images of the one or more images, determine a respective image size of the respective image. Additionally or alternatively, the program instructions may cause the network edge device to compare the respective image size to a respective threshold range and generate an alert if the respective image size falls outside of the respective threshold range.

In some embodiments, the program instructions may be further executable to determine, based on one or more algorithms, the respective threshold range. Additionally or alternatively, the respective image size may correspond to one or more sub-regions of the respective image. According to some embodiments, a different alert may be generated if a plurality of respective image sizes of the one or more images originating from a camera device of the one or more camera devices is approximately equal. In some embodiments, the network edge device may comprise internal memory storage of typical image sizes used in determining the threshold range. Additionally or alternatively, the network edge device may comprise internal memory storage of at least one of one or more standard deviation values, one or more minimum image sizes, and one or more maximum image sizes used in determining the threshold range.

According to some embodiments, a network edge device may include communication circuitry for establishing a connection between at least one premise camera device and a remote user. The network edge device may further include at least one processor coupled to the communication circuitry and the at least one processor is configured to cause the network edge device to receive one or more images originating from the at least one premise camera device, according to some embodiments. Additionally or alternatively, the network edge device may determine one or more image sizes of the one or more images, compare the one or more image sizes to a threshold value, and generate an alert if any of the one or more image sizes is less than the threshold value.

In some embodiments, the network edge device may determine, based on one or more algorithms, the threshold value. Additionally or alternatively, respective image sizes of the one or more image sizes may correspond to one or more respective sub-regions of the one or more images. In some embodiments, a different alert may be generated if a plurality of the one or more image sizes of the one or more images originating from a camera device of the one or more camera devices is approximately equal. In some embodiments, the network edge device may comprise internal memory storage of one or more typical image sizes and one or more threshold values. According to some embodiments, the threshold value may be automatically compared to the one or more image sizes at least partially in response to receiving the one or more images and determining the one or more image sizes. Additionally or alternatively, the network edge device may include internal memory storage of at least one of one or more standard deviation values, one or more maximum image sizes, and one or more minimum image sizes used in determining the threshold value.

According to some embodiments, a method by a network edge device may comprise receiving one or more images originating from at least one premise camera device. The method may further include determining one or more image sizes of the one or more images, determining a difference between the one or more image sizes and one or more threshold values of a threshold range, and generating an alert if an absolute value of the difference is greater than at least one of the one or more threshold values, according to some embodiments.

In some embodiments, the method may further include determining a difference between the one or more image sizes and one or more additional threshold values of a second threshold range and generating a different alert if an absolute value of the difference is greater than at least one of the one or more additional threshold values. Additionally or alternatively, a first image size of the one or more image sizes may correspond to a first sub-region of a first image of the one or more images.

According to some embodiments, the method the at least one premise camera device is capable of altering at least one of its viewing scene and field of view. Additionally or alternatively, the method may further include receiving one or more additional images originating from at least one premise camera device and corresponding to at least one of one or more different viewing scenes and different fields of view. The method may also include determining one or more additional image sizes of the one or more additional images, determining a difference between the one or more additional image sizes and one or more additional threshold values of a second threshold range, and generating a different alert if an absolute value of the difference is greater than at least one of the one or more additional threshold values, according to some embodiments. Additionally or alternatively, the method may further include generating a different alert if a plurality of the one or more image sizes of the one or more images originating from the least one premise camera device is approximately equal. According to some embodiments, the network edge device may comprise internal memory storage of at least one of one or more standard deviation values, one or more maximum image sizes, and one or more minimum image sizes used in determining the one or more threshold values of the threshold range.

Although the embodiments above have been described in considerable detail, numerous variations and modifications will become apparent to those skilled in the art once the above disclosure is fully appreciated. For example, while many of the embodiments above are described with respect to a cloud server, simpler embodiments involving a single server are also envisioned. It is intended that the following claims be interpreted to embrace all such variations and modifications.

What is claimed is:

1. A non-transitory computer readable storage medium comprising program instructions executable by at least one processor of a network edge device, wherein the program instructions cause the network edge device to:
   receive one or more images originating from one or more camera devices; and
   for respective images of the one or more images:
      determine a respective image file size of the respective image, wherein the respective image file size corresponds to an amount of bytes for storing the respective image in memory;
      determine, based on stored respective comparable images, a respective threshold range including a first threshold amount of bytes and a second threshold amount of bytes, wherein the first and second threshold amount of bytes characterize respective file sizes of the stored respective comparable images comprising imagery associated with low scene information content;
      compare the respective image file size to a respective threshold range including the first threshold amount of bytes and the second threshold amount of bytes; and
      generate an alert if the respective image file size falls outside of the respective threshold range, wherein if a respective image's file size falls outside of the respective threshold range, the alert is indicative of the respective image comprising imagery associated with low scene information content.

2. The non-transitory computer readable storage medium of claim 1, wherein the program instructions are further executable to:
   determine, based on an algorithm, the respective threshold range.

3. The non-transitory computer readable storage medium of claim 1, wherein the respective image file size corresponds to one or more sub-regions of the respective image.

4. The non-transitory computer readable storage medium of claim 1, wherein a different alert is generated if a plurality of respective image file sizes of the one or more images originating from a camera device of the one or more camera devices is approximately equal.

5. The non-transitory computer readable storage medium of claim 1, wherein the network edge device comprises internal memory storage of typical image file sizes used in determining the threshold range.

6. The non-transitory computer readable storage medium of claim 1, wherein the network edge device comprises internal memory storage of one or more standard deviation values used in determining the threshold range.

7. The non-transitory computer readable storage medium of claim 1, wherein the network edge device comprises internal memory storage of at least one of one or more minimum image file sizes and one or more maximum image file sizes used in determining the threshold range.

8. A network edge device, comprising:
   communication circuitry for establishing a connection between at least one premise camera device and a remote user; and
   at least one processor coupled to the communication circuitry, wherein the at least one processor is configured to cause the network edge device to:
   receive one or more images originating from the at least one premise camera device;
   determine one or more image file sizes of the one or more images, wherein the one or more image file sizes correspond to an amount of bytes for storing the one or more images in memory;
   determine, based on stored respective comparable images, a threshold range including a first threshold amount of bytes and a second threshold amount of bytes, wherein the first and second threshold amount of bytes characterize respective file sizes of the stored respective comparable images comprising imagery associated with low scene information content;
   compare the one or more image file sizes to the threshold range including a first threshold amount of bytes and a second threshold amount of bytes; and
   generate an alert if any of the one or more image file sizes falls outside of the threshold range, wherein if any of the one or more image file sizes falls outside of the threshold range, the alert is indicative of the one or more images comprising imagery associated with low scene information content.

9. The network edge device of claim 8, wherein the at least one processor is further configured to cause the network edge device to:
   determine the threshold range based on at least one of analysis or comparison of received and stored typical imagery.

10. The network edge device of claim 8, wherein respective image file sizes of the one or more image file sizes correspond to one or more respective sub-regions of the one or more images.

11. The network edge device of claim 8, wherein a different alert is generated if a plurality of the one or more image file sizes of the one or more images originating from a camera device of the one or more camera devices is approximately equal.

12. The network edge device of claim 8, wherein the network edge device comprises internal memory storage of one or more typical image file sizes and one or more threshold values.

13. The network edge device of claim 8, wherein the threshold range is automatically compared to the one or more image file sizes at least partially in response to receiving the one or more images and determining the one or more image file sizes.

14. The network edge device of claim 8, wherein the network edge device comprises internal memory storage of at least one of one or more standard deviation values, one or more maximum image file sizes, and one or more minimum image file sizes used in determining the threshold range.

15. A method, comprising:
by a network edge device:
receiving one or more images originating from at least one premise camera device;
determining one or more image file sizes of the one or more images;
determining, based on stored respective comparable images, a respective threshold range including a first threshold image file size and a second threshold image file size, wherein the first and second threshold image file sizes characterize respective image file sizes of the stored respective comparable images comprising imagery associated with low scene information content determining a difference between the one or more image file sizes and the first and second threshold image file sizes of the threshold range, wherein the one or more image file sizes correspond to an amount of bytes for storing the one or more images in memory; and
generating an alert if an absolute value of the difference is greater than at least one of the first and second threshold image file sizes, wherein the absolute value of the difference is greater than at least one of the first and second threshold image file sizes, the alert is indicative of the one or more images comprising imagery associated with low scene information content.

16. The method of claim 15, further comprising:
determining a difference between the one or more image file sizes and one or more additional threshold values of a second threshold range; and
generating a different alert if an absolute value of the difference is greater than at least one of the one or more additional threshold values.

17. The method of claim 15, wherein a first image file size of the one or more image file sizes corresponds to a first sub-region of a first image of the one or more images.

18. The method of claim 15, wherein the at least one premise camera device is capable of altering at least one of its viewing scene and field of view, and wherein the method further comprises:
receiving one or more additional images originating from at least one premise camera device and corresponding to at least one of one or more different viewing scenes and different fields of view;
determining one or more additional image file sizes of the one or more additional images;
determining a difference between the one or more additional image file sizes and one or more additional threshold values of a second threshold range; and
generating a different alert if an absolute value of the difference is greater than at least one of the one or more additional threshold values.

19. The method of claim 15, further comprising:
generating a different alert if a plurality of the one or more image file sizes of the one or more images originating from the least one premise camera device is approximately equal.

20. The method of claim 15, wherein the network edge device comprises internal memory storage of at least one of one or more standard deviation values, one or more maximum image file sizes, and one or more minimum image file sizes used in determining the first and second threshold image file sizes of the threshold range.

* * * * *

UNITED STATES PATENT AND TRADEMARK OFFICE
CERTIFICATE OF CORRECTION

| | | |
|---|---|---|
| PATENT NO. | : 11,968,353 B2 | Page 1 of 1 |
| APPLICATION NO. | : 17/711254 | |
| DATED | : April 23, 2024 | |
| INVENTOR(S) | : Brett B. Stewart | |

It is certified that error appears in the above-identified patent and that said Letters Patent is hereby corrected as shown below:

In the Claims

Claim 15, Column 25, Line 24, please delete "information content determing a difference" and insert
--information content;
determining a difference--.

Signed and Sealed this
Eighteenth Day of June, 2024

Katherine Kelly Vidal
*Director of the United States Patent and Trademark Office*